US012488810B2

United States Patent
Chiu et al.

(10) Patent No.: US 12,488,810 B2
(45) Date of Patent: Dec. 2, 2025

(54) EXPANDABLE VIDEO LOOP WITH REPLACEMENT AUDIO

(71) Applicant: Loop Now Technologies, Inc., San Mateo, CA (US)

(72) Inventors: Edwin Chiu, Cupertino, CA (US); Jerry Ting Kwan Luk, Menlo Park, CA (US); Jeremiah Kevin Tu, Sunnyvale, CA (US); Ziming Zhuang, Palo Alto, CA (US)

(73) Assignee: Loop Now Technologies, Inc., San Mateo, CA (US)

( * ) Notice: Subject to any disclaimer, the term of this patent is extended or adjusted under 35 U.S.C. 154(b) by 0 days.

(21) Appl. No.: 18/748,163

(22) Filed: Jun. 20, 2024

(65) Prior Publication Data
US 2024/0428827 A1 Dec. 26, 2024

Related U.S. Application Data

(60) Provisional application No. 63/649,966, filed on May 21, 2024, provisional application No. 63/638,476, filed on Apr. 25, 2024, provisional application No. 63/571,732, filed on Mar. 29, 2024, provisional application No. 63/557,623, filed on Feb. 26, 2024,
(Continued)

(51) Int. Cl.
*G11B 27/036* (2006.01)
*G06Q 30/015* (2023.01)
*G06V 20/40* (2022.01)
*G10L 13/02* (2013.01)

(52) U.S. Cl.
CPC ......... *G11B 27/036* (2013.01); *G06Q 30/015* (2023.01); *G06V 20/46* (2022.01); *G10L 13/02* (2013.01)

(58) Field of Classification Search
CPC .... G11B 27/036; G06V 20/46; G06Q 30/015; G10L 13/02
See application file for complete search history.

(56) References Cited

U.S. PATENT DOCUMENTS 8,069,414 B2 11/2011 Hartwig et al.
8,244,707 B2 8/2012 Lin et al.
(Continued)

FOREIGN PATENT DOCUMENTS

KR 101606860 B1 3/2016

*Primary Examiner* — Thai Q Tran
*Assistant Examiner* — Jose M Mesa
(74) *Attorney, Agent, or Firm* — Adams Intellex, PLC

(57) ABSTRACT

Techniques for manipulating an expandable video loop with replacement audio are provided. A video that includes a performance by an individual is accessed. One or more processors are used to identify a minimum desired loop within the performance by the individual. Video information is extracted from the video loop and analyzed with machine learning. An audio file is obtained based on a script written by a user. The script is combined with a synthesized voice which is created from the individual video performance to obtain the audio file. The extracted video information is used to manipulate the lips of the individual based on the audio file. A second video loop is created, combining the individual from the first video loop with the video of the manipulated lips of the individual and the synthesized audio file. The second video loop is appended to the end of the first video loop.

22 Claims, 7 Drawing Sheets

Related U.S. Application Data provisional application No. 63/557,622, filed on Feb. 26, 2024, provisional application No. 63/557,628, filed on Feb. 26, 2024, provisional application No. 63/613,312, filed on Dec. 21, 2023, provisional application No. 63/604,261, filed on Nov. 30, 2023, provisional application No. 63/546,768, filed on Nov. 1, 2023, provisional application No. 63/546,077, filed on Oct. 27, 2023, provisional application No. 63/536,245, filed on Sep. 1, 2023, provisional application No. 63/524,900, filed on Jul. 4, 2023, provisional application No. 63/522,205, filed on Jun. 21, 2023.

(56) References Cited

U.S. PATENT DOCUMENTS

| | | |
|---|---|---|
| 8,572,490 B2 | 10/2013 | Hartwig et al. |
| 9,118,712 B2 | 8/2015 | McCoy et al. |
| 9,152,392 B2 | 10/2015 | Petro et al. |
| 9,532,116 B2 | 12/2016 | Terpe |
| 9,608,983 B2 | 3/2017 | Fee |
| 9,645,700 B2 | 5/2017 | Tsai |
| 9,693,013 B2 | 6/2017 | Nesamoney et al. |
| 9,824,372 B1 | 11/2017 | Seth et al. |
| 10,089,402 B1 | 10/2018 | Winkler et al. |
| 10,496,350 B2 | 12/2019 | Lazier et al. |
| 10,955,999 B2 | 3/2021 | Lotinsky et al. |
| 11,317,060 B1 | 4/2022 | Libin |
| 12,154,598 B1 * | 11/2024 | Warnick ............... G06V 40/161 |
| 2007/0043713 A1 | 2/2007 | Elmi et al. |
| 2010/0149359 A1 | 6/2010 | Taoka |
| 2013/0021373 A1 | 1/2013 | Vaught et al. |
| 2013/0097477 A1 | 4/2013 | Adolf et al. |
| 2013/0145267 A1 | 6/2013 | Ramachandran |
| 2013/0215116 A1 | 8/2013 | Siddique et al. |
| 2013/0276021 A1 | 10/2013 | Cho |
| 2014/0101537 A1 | 4/2014 | Antkowiak et al. |
| 2014/0106881 A1 | 4/2014 | Antkowiak et al. |
| 2014/0229331 A1 | 8/2014 | McIntosh et al. |
| 2014/0270711 A1 * | 9/2014 | Maser ................ G11B 27/034 386/290 |
| 2014/0376876 A1 | 12/2014 | Bentley et al. |
| 2015/0177940 A1 | 6/2015 | Trevino et al. |
| 2015/0195175 A1 | 7/2015 | Kariman |
| 2015/0213516 A1 | 7/2015 | Jeremias |
| 2015/0278348 A1 | 10/2015 | Paruchuri et al. |
| 2016/0065929 A1 | 3/2016 | Barcons-Palau et al. |
| 2016/0088369 A1 | 3/2016 | Terpe |
| 2016/0093105 A1 | 3/2016 | Rimon et al. |
| 2017/0011745 A1 * | 1/2017 | Navaratnam .......... H04N 7/157 |
| 2017/0062006 A1 * | 3/2017 | Plom .................... G11B 27/031 |
| 2017/0109584 A1 | 4/2017 | Yao et al. |
| 2017/0269816 A1 | 9/2017 | Bradley et al. |
| 2018/0068019 A1 | 3/2018 | Novikoff et al. |
| 2018/0132011 A1 | 5/2018 | Shichman et al. |
| 2018/0253765 A1 | 9/2018 | Avedissian et al. |
| 2018/0288396 A1 | 10/2018 | Bouazizi et al. |
| 2021/0014559 A1 | 1/2021 | Thapaliya |
| 2022/0053233 A1 | 2/2022 | Baxter et al. |
| 2022/0122161 A1 | 4/2022 | Perera |
| 2022/0191594 A1 | 6/2022 | Devoy, III et al. |
| 2022/0201241 A1 * | 6/2022 | Oulès ................. H04N 21/8456 |
| 2022/0208155 A1 * | 6/2022 | Ivers ..................... G10H 1/368 |
| 2022/0345755 A1 | 10/2022 | Pollock et al. |
| 2022/0353473 A1 | 11/2022 | Springer |
| 2023/0126108 A1 | 4/2023 | Roper |

* cited by examiner

EXPANDABLE VIDEO LOOP WITH REPLACEMENT AUDIO

RELATED APPLICATIONS

This application claims the benefit of U.S. provisional patent applications "Expandable Video Loop With Replacement Audio" Ser. No. 63/522,205, filed Jun. 21, 2023, "Text-Driven Video Editing With Machine Learning" Ser. No. 63/524,900, filed Jul. 4, 2023, "Livestream With Large Language Model Assist" Ser. No. 63/536,245, filed Sep. 1, 2023, "Non-Invasive Collaborative Browsing" Ser. No. 63/546,077, filed Oct. 27, 2023, "AI-Driven Suggestions For Interactions With A User" Ser. No. 63/546,768, filed Nov. 1, 2023, "Customized Video Playlist With Machine Learning" Ser. No. 63/604,261, filed Nov. 30, 2023, "Artificial Intelligence Virtual Assistant Using Large Language Model Processing" Ser. No. 63/613,312, filed Dec. 21, 2023, "Artificial Intelligence Virtual Assistant With LLM Streaming" Ser. No. 63/557,622, filed Feb. 26, 2024, "Self-Improving Interactions With An Artificial Intelligence Virtual Assistant" Ser. No. 63/557,623, filed Feb. 26, 2024, "Streaming A Segmented Artificial Intelligence Virtual Assistant With Probabilistic Buffering" Ser. No. 63/557,628, filed Feb. 26, 2024, "Artificial Intelligence Virtual Assistant Using Staged Large Language Models" Ser. No. 63/571,732, filed Mar. 29, 2024, "Artificial Intelligence Virtual Assistant In A Physical Store" Ser. No. 63/638,476, filed Apr. 25, 2024, and "Ecommerce Product Management Using Instant Messaging" Ser. No. 63/649,966, filed May 21, 2024.

Each of the foregoing applications is hereby incorporated by reference in its entirety.

FIELD OF ART

This application relates generally to video generation and more particularly to manipulating an expandable video loop with replacement audio.

BACKGROUND

"Imitation is the sincerest form of flattery" is an adage that can be seen in practice all around us. Clothing, music, food, home design and furnishing, cars, electronics, and many more facets of our world are replete with good ideas, and sometimes not so good ideas, being imitated by others again and again. Original designs can be copied within days, or even hours, by others in the same or similar areas of design and manufacturing. Sometimes the imitation is clearly illegal, such as counterfeit currency, fake fashion accessories, or bootleg copies of software. Other times, the line between legal and illegal can be more difficult to distinguish. Clothing that mimics a trend but with differences in cut, textiles, colors, or sizes can be generated quickly by many competitors at the same time. This form of imitation can in some cases benefit the original designer or distributor while the volume of sales is negatively impacted. The price of an original piece can increase, even as the number of pieces sold decreases. Many product lines take imitations and knock-offs into account as part of the cost of doing business. Clothing trends come and go so quickly that by the time one line of dresses, pants, or blouses is sold out, another trend has already begun. Other markets fiercely defend their ideas through various levels of security, non-compete agreements, and legal actions. Military organizations have entire teams of people devoted to securing their designs for hardware, software, tactics, and deployments. At the same time, other teams are working to figure out the plans and designs of armies and navies of foreign powers.

Music and other art forms encounter imitation and copying routinely. When a film featuring a comic book hero makes a lot of money, more comic book movies are sure to follow. Television, books, audiobooks, and even real comic books quickly take up the same idea and ride the wave for as long as possible. One white kitchen or bathroom with particular appliances, cabinet hardware, countertops, and flooring that sells well can lead to dozens more across the country. And since white is perhaps the least expensive color of paint to produce, builders and designers are delighted to produce one after the other. White is also easy to paint over, so a customer who decides on green, blue, or orange can quickly get what they want and be "unique". As our ability to mass produce goods, physical or digital, continues to improve and accelerate, artists, designers, musicians, and other creators are increasingly becoming "content generators". Music can be recorded digitally using one instrument and then altered to play in a different key, at a different tempo, or using a different instrument altogether. A set of notes forming a pattern can be repeated automatically by a tone generator or repeater during a live performance, or can be used as an element in a recording. A single voice artist can record his or her voice singing as many parts as desired, and can then overlay them to create lush chords, background vocals, or various digital effects. Libraries of software code can now be purchased and reused to provide routine elements for displays or to solve mathematical problems, from things as simple as obtaining a time stamp or pixel coordinate to completing complex computations for bond yields or chemical formulas. As we continue to expand our ability to communicate with one another and store ideas and information in files that can be shared, the art and science of imitation will continue to grow and enrich our lives.

SUMMARY

Producing short-form videos can be time consuming and expensive. Even for amateurs using cellphones, the time required to set up the camera, lights, and microphones; prepare the stage or setting; acquire products and props; and determine what to say, record, and edit can take many hours to create an effective video ready to be distributed. Professionally produced videos can take even longer, involving multiple groups and skill sets, and significant amounts of money. Once created, it is not unusual that a video would require follow-up content directly related to the original video. However, recreating the scene, reacquiring the performer, setting up the equipment, and so on all over again can be cost prohibitive. Thus, the ability to modify a repeatable section of the existing video can be valuable in terms of time and money saved, and can also provide continuity and minimize distractions for the viewer.

Disclosed embodiments provide techniques for manipulating an expandable video loop with replacement audio. A video that includes a performance by an individual is accessed. One or more processors are used to identify a minimum desired loop within the performance by the individual. Video information is extracted from the video loop and analyzed with machine learning. An audio file is obtained based on a script written by a user. The script is combined with a synthesized voice which is created from the individual video performance to obtain the audio file. The extracted video information is used to manipulate the lips of the individual based on the audio file. A second video loop is created, combining the individual from the first video loop with the video of the manipulated lips of the individual and the synthesized audio file. The second video loop is appended to the end of the first video loop.

A computer-implemented method for video generation is disclosed comprising: accessing a first video, wherein the first video includes a performance by an individual; identifying, using one or more processors, a minimum desired loop within the performance by the individual; extracting video information from the minimum desired loop that was identified within the first video; obtaining a first audio file; manipulating lips of the individual within the video information which was extracted, wherein the manipulating is based on the first audio file; and creating a second video, wherein the second video comprises a second loop, wherein the second loop includes the video information which was manipulated, and wherein the second video includes the first audio file. Some embodiments comprise producing a third loop. In embodiments, the third loop is based on a second audio file. In embodiments, the third loop further comprises altering lips of the individual within the video information which was extracted, wherein the manipulating is based on the second audio file. Some embodiments comprise appending the third loop to the second video. Some embodiments comprise replacing, in the second video, the second loop with the third loop.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Short-form videos featuring an engaging host highlighting and demonstrating products can be an effective way of winning customers and promoting sales. Identifying sections of short-form videos that can be seamlessly modified and repeated can promote viewer engagement, and decisions to purchase can improve ecommerce even more. Short-form videos can be accessed and updated to promote products and services offered by an ecommerce website, generate news broadcast articles, deliver lectures with question-and-answer sessions, announce weather updates, present new products for sale, and so on. A section of an existing short-form video can be identified and duplicated by a machine learning model. The video loop can be tailored to match seamlessly to the end of the existing video so that the addition is unnoticed by the viewer. Scripts can be written and recorded by voice actors, product experts, social media influencers, teachers, sales associates, product users, and so on. The machine learning model can generate a library of face, mouth, and lip movements that match the recorded script and can be combined with the video loop to create a new loop with new audio content. As new content is needed, based on viewer interactions, new products, breaking news, etc., additional loops can be generated and added to the end of the existing video. As the machine learning model grows and the short-form video library expands, the ability to hold viewer interest and expand market share improves.

Figure 1:
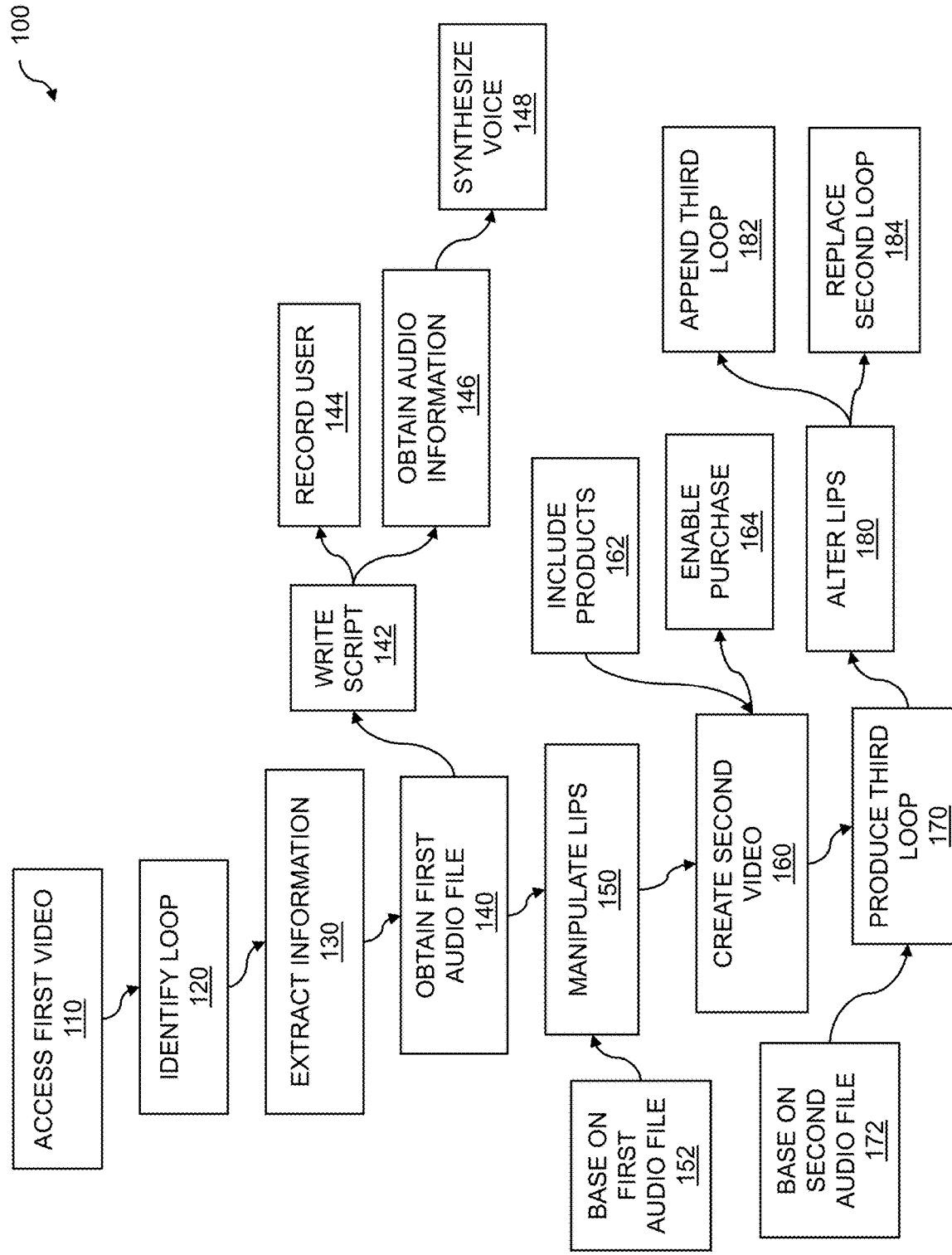
FIG. 1 is a flow diagram for an expandable video loop with replacement audio.

FIG. 1 is a flow diagram for an expandable video loop with replacement audio. The flow 100 includes accessing a first video 110, wherein the first video includes a performance by an individual who can be a first video host of the video. In embodiments, the first video can include an organic, sponsored, or promotional short-form video. Organic videos are made by users and shared using the free, built-in capabilities of a particular social media platform. Every social media platform has capabilities available to any user: posts, hashtags, likes, shares, etc. Videos shared with these built-in capabilities are part of the natural uses of the platform itself. Sponsored videos are paid for and directly associated with a particular organization, group, or person. Promoted videos are presented to viewers by third parties, celebrities, social media influencers, advertisers, product manufacturers, etc. They can be recommended to viewers as part of other forms of advertising or within other forms of media. In some embodiments, the first video can comprise a livestream video or livestream video replay. Livestream events are broadcast over the Internet for live viewing. These events are typically recorded for rebroadcast as standalone videos in complete or edited form.

The flow 100 includes identifying 120, using one or more processors, a minimum desired loop within the performance by the individual. A video loop is a video or video segment that repeats itself, in some cases multiple times. Video loops can be used to draw viewer attention, emphasize content, add length, and so on. The minimum desired loop can be a segment of the first video that, when repeated, does not appear obvious to a viewer that the video is looping. In embodiments, the minimum desired loop can be used to extend the length of the first video in order to provide additional audio and video content without recording additional video footage. The video loop can be long enough to allow synthesized audio and video to be generated and combined with the loop footage. It can also be long enough to allow the loop to be added to the end of the first video without the viewer noticing that the video is being repeated. In embodiments, the determining of a minimum desired loop can be accomplished by analyzing the first video. The analyzing can be accomplished by machine learning and can include detecting one or more words spoken by the host or one or more actions of the host; assessing the body position of the host; determining one or more voice inflections of the host; and/or detecting one or more subject matters discussed by the host. The object of the analysis can be to identify specific beginning and ending points in the first video where the synthesized video loop can be added into the real-time replay seamlessly, so that the viewers are unaware of the transition from the first video to the video loop. In some embodiments, a minimum length for the video loop, e.g., ten seconds, 300 video frames, and so on, can be designated. In some embodiments, the determining of the insertion point can form a response to the interaction of viewers to a livestream video event. As the video is played, viewers can ask for more information about a product for sale that is highlighted by the host, interact on a particular subject being discussed by the host, etc. If a viewer completes a purchase, donates, or signs up for a promotion, the operator can insert a recognition by the host using a synthesized video loop segment. AI-generated speech can be used to add the username of the viewer as provided in a text interaction during the livestream event, etc.

The flow 100 includes extracting video information 130 from the minimum desired loop that was identified within the first video. In embodiments, the minimum desired loop, when viewed repeatedly by a human, cannot easily be perceivable as a loop. The runtime of a single loop of the minimum desired loop can comprise ten or more seconds. The runtime of a single loop of the minimum desired loop can comprise one or more gestures or head movements by the individual. After the machine learning analysis is completed, the start and end point of the minimum desired loop can be identified. The section of the first video comprising the minimum desired video loop can be extracted, copied, and used as the basis of a new synthesized video segment to be added to the end of the first video. As stated above and throughout, the loop can be identified by the machine learning model so that the ending of the first video and the beginning of the synthesized video loop are not easily noticed by human viewers.

In embodiments, the video loop can contain gestures or head movements by the individual. Using a machine learning artificial intelligence (AI) neural network, the images of the host can be used to create a model of the host, including facial expressions, gestures, and so on. In some embodiments, the various components of the model can be isolated and swapped out as desired, so that a product for sale or alternate article of clothing can be included in a synthesized video using the model. A model of the video host can be built using a generative model. The generative model can include a generative adversarial network (GAN). A generative adversarial network (GAN) includes two parts. A generator learns to generate plausible data using digital images of the host as input. The generated instances are input to a discriminator. The discriminator learns to distinguish the generator's fake data from real data by comparing the generated facial features to the facial features of the host. The discriminator penalizes the generator for generating implausible results. During the training process, over time, the output of the generator improves, and the discriminator has less success distinguishing real output from fake output. Once the fake output of the video host is sufficiently plausible, it can be used in the creation of synthesized video segments.

The flow 100 includes obtaining a first audio file 140. The first audio file can comprise an audio recording of a first audio file user. In the flow 100, obtaining the first audio file further comprises writing a script 142, wherein the script comprises text. The obtaining can further comprise recording a user 144 reading the text. In embodiments, the script can be used to highlight a product for sale, respond to a viewer comment or question, honor a viewer for a donation or significant purchase, make an announcement, and so on. The user who is recording the script can be a voice actor, impressionist, mimic, and so on. In some embodiments, the user recording the script can be an AI machine learning model. In other embodiments, the voice of the individual in the original video can be replaced with the voice of the user reading the script.

The obtaining the first audio file 140 can further comprise obtaining audio information 146 from the performance by the individual, and further comprises synthesizing a voice 148 of the individual, wherein the synthesizing is based on the script 142. In embodiments, an imitation-based algorithm can take the recorded voice of the user reading a script in a first audio file as input to a voice conversion module. A neural network, such as a Generative Adversarial Network (GAN), can be used to record the style, intonation, and vocal qualities of both the individual and the first audio file user, convert them into linguistic data, and use the characteristics of the host voice to repeat the text of the user in a first audio file. For example, the user performing in the first audio file can say the phrase, "My name is Joe." The phrase can be recorded and analyzed. The text of the phrase can be processed along with the vocal characteristics of speed, inflection, emphasis, and so on. The text and vocal characteristics can then be replayed using the style, intonation, and vocal inflections of the individual without changing the text, speed, or emphasis of the first audio user's statement. Thus, the same phrase, "My name is Joe", is heard in the voice of the individual in the original video. The GAN processing can be used to incrementally improve the quality of the individual's voice by comparing it to recordings of the host. As more data on the individual's voice is collected and used to generate speech, the ability to mimic the voice improves.

In embodiments, the identifying of a minimum desired video loop can be based on the first audio file. The length of the first audio file can be used to determine the lowest length possible for the minimum desired video loop. In embodiments, as additional video loops are generated to add to the first video, video frames can be added, repeated, or deleted from the end of the first video or the beginning of the video loop in order to make the transition from the first video to the video loop unnoticeable by the viewer. In some embodiments, the length of the video loop can be extended by adding frames or shortened by deleting frames in order to fit the length of an additional recorded audio file.

The flow 100 includes manipulating lips 150 of the individual within the video information which was extracted, wherein the manipulating is based on the first audio file 152. In embodiments, the first video 110 can contain face and mouth movements by the individual. Using a machine learning artificial intelligence (AI) neural network, the images of the host can be used to create a model of the host, focusing on mouth movements, facial expressions, and gestures. The facial movements of mouth, eyes, and nose can be analyzed along with the accompanying vocal sounds to isolate words, phrases, phonemes (single vocal sounds that make up words), diphthongs (combinations of vowel sounds), and so on. Each mouth and face movement can be linked to the associated word sound and text so that stored elements of a video database of isolated mouth and face movements can be combined to coincide with the appropriate vocal sounds contained in an audio file. The various components of the video model can be isolated and swapped out as desired, so that the words and phrases of a synthesized audio file can be used to manipulate the lips and facial movements of a video host appearing in a video loop. In embodiments, the video information that was manipulated can further comprise synthesizing one or more new gestures for the individual, wherein the gestures are based on the first audio file. The one or more gestures include one or more repetitive head movements. A model of the video host can be built using a generative model. The generative model can include a generative adversarial network (GAN). A generative adversarial network (GAN) includes two parts. A generator learns to generate plausible data using digital images of the host as input. The generated instances are input to a discriminator. The discriminator learns to distinguish the generator's fake data from real data by comparing the generated facial features to the facial features of the host. The discriminator penalizes the generator for generating implausible results. During the training process, over time, the output of the generator improves, and the discriminator has less success distinguishing real output from fake output. Once the fake output of the video host is sufficiently plausible, it can be used in the creation of synthesized video loop segments.

The flow 100 includes creating a second video 160, wherein the second video comprises a second loop, wherein the second loop includes the video information which was manipulated, and wherein the second video includes the first audio file. In embodiments, the extracted video loop can be combined with the audio file so that the lips and facial features of the video host coincide with the words and phrases of the audio file. Thus, the combination of the extracted video loop, the manipulated video information, and the synthesized audio file can be used to create a second video featuring the individual in the video speaking the contents of the audio file with lip and facial features appropriate to the words being spoken. In embodiments, the combined second video loop can be stitched to the end of the first video loop so that the transition from the end of the first video loop to the second video loop cannot be detected by the viewer. In some embodiments, the second video can comprise a stream. The second video can comprise a livestream. The second video can also comprise a video help line for a customer, a lecture delivered by a teacher followed by a question-and-answer session, responses to an online product demonstration, news items delivered by an anchorperson at a news desk, and so on.

The creating a second video further comprises enabling, within an ecommerce environment, an ecommerce purchase of one or more products for sale, wherein the second video includes the one or more products for sale 162, and wherein the second video includes the ecommerce environment. In embodiments, the video host can highlight products and services for sale. In some embodiments, the first and second video can comprise a livestream event. The host can demonstrate, endorse, recommend, and otherwise interact with one or more products for sale. An ecommerce purchase of at least one product for sale can be enabled 164 to the viewer, wherein the ecommerce purchase is accomplished within the livestream video window. As the host interacts with and presents the products for sale, a product card can be included within a livestream shopping window. An ecommerce environment associated with the livestream event can be generated on the viewer's mobile device or other connected television device as the event progresses. The ecommerce environment on the viewer's mobile device can display the livestream event and the ecommerce environment at the same time. A mobile device user can interact with the product card in order to learn more about the product with which the product card is associated. While the user is interacting with the product card, the livestream video event continues to play. Purchase details of the at least one product for sale are revealed, wherein the revealing is rendered to the viewer. The viewer can purchase the product through the ecommerce environment, including a virtual purchase cart. The viewer can purchase the product without having to "leave" the livestream event or video. Leaving the livestream event can include having to disconnect from the event, open an ecommerce window separate from the livestream event, and so on. The livestream event can continue while the viewer is engaged with the ecommerce purchase. In embodiments, the livestream event can continue "behind" the ecommerce purchase window, where the virtual purchase window can obscure or partially obscure the livestream event. In some embodiments, the synthesized video segment can display the virtual product cart while the synthesized video segment plays. The virtual product cart can cover a portion of the synthesized video segment while it plays.

The flow 100 further comprises producing a third loop 170, wherein the third loop is based on a second audio file 172. In embodiments, the third loop 170 further comprises altering lips 180 of the individual within the video information which was extracted, wherein the manipulating is based on the second audio file. The third loop further comprises appending the third loop 182 to the second video. In some embodiments, the third loop further comprises replacing 184, in the second video, the second loop with the third loop. As described above and throughout, the video loop identified and extracted from the first video can be used multiple times to create additional video loops by combining the video loop with additional synthesized audio files and manipulated lip and facial video segments. Supplementary scripts can be written, spoken, and recorded by a user, the user's voice can be replaced by the synthesized voice of the video host, the resulting audio file can be used to generate matching lip and facial video movements, and the combined audio and facial features video can be inserted into the video loop to create third, fourth, fifth, and so on video loops to be appended to the second video. In some embodiments, a subsequent video loop can be used to replace an earlier segment, so that when the entire set of video loops is replayed, a different response to a question or additional information is given in response to a viewer question, for example. A change in the price of an item for sale can be updated by replacing a video loop, answers to additional questions from viewers can be appended to the last loop, news items can be added and presented by a news anchor, new items can be presented and sold by a livestream host, weather updates can be presented, and so on.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
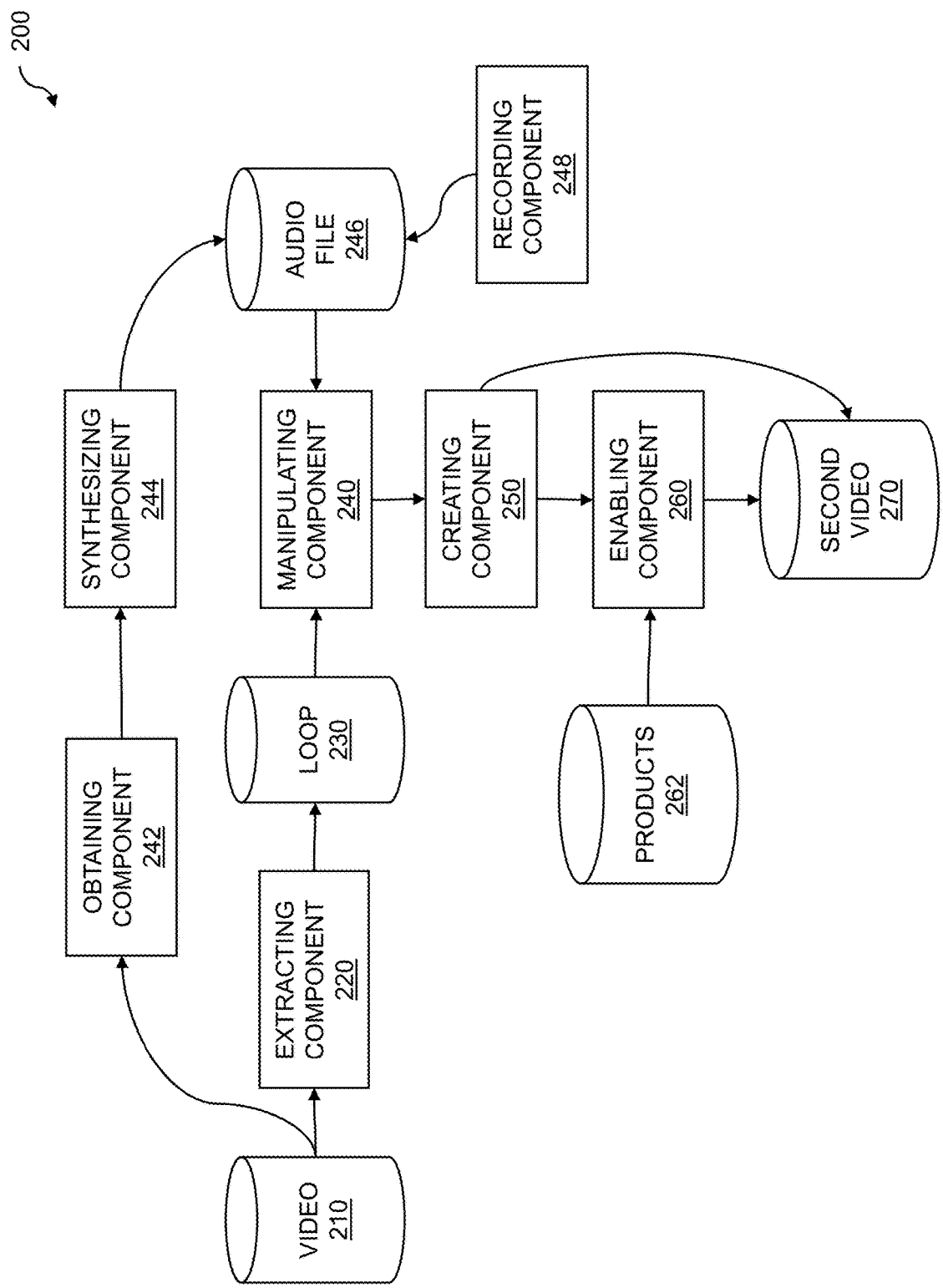
FIG. 2 is a block diagram for an expandable video loop with replacement audio.

FIG. 2 is a block diagram for an expandable video loop with replacement audio. The block diagram 200 includes accessing a first video 210, wherein the first video includes a performance by an individual. In embodiments, the first video can include an organic, sponsored, or promotional short-form video. Organic videos are made by users and are shared using the free, built-in capabilities of a particular social media platform. Every social media platform has capabilities available to any user: posts, hashtags, likes, shares, etc. Videos shared with these built-in capabilities are part of the natural uses of the platform itself. Sponsored videos are paid for and directly associated with a particular organization, group, or individual. Promoted videos are presented to viewers by third parties, celebrities, social media influencers, advertisers, product manufacturers, etc. They can be recommended to viewers as part of other forms of advertising or within other forms of media. In some embodiments, the first video can comprise a livestream video or livestream video replay. Livestream events are broadcast over the Internet for live viewing. These events are typically recorded for rebroadcast as stand-alone videos in complete or edited form.

The block diagram 200 includes an extracting component 220. The extracting component 220 can be used to extract video information from a minimum desired loop 230 that can be identified within the first video. In embodiments, the minimum desired loop can be used to extend the length of the first video to provide additional audio and video content without recording additional video footage. The video loop can be long enough to allow synthesized audio and video to be generated and combined with the loop footage. It can also be long enough to allow the loop to be added to the end of the first video without the viewer noticing that the video is being repeated. In embodiments, the determining of a minimum desired loop can be accomplished by analyzing the first video. The analyzing can be accomplished by machine learning and can include detecting one or more words spoken by the host or one or more actions of the host, assessing the body position of the host, determining one or more voice inflections of the host, or detecting one or more subject matters discussed by the host. The object of the analysis is to identify specific beginning and ending points in the first video where the synthesized video loop can be added into the real-time replay seamlessly, so that the viewers are unaware of the transition from the first video to the video loop. In some embodiments, a minimum length for the video loop, e.g., ten seconds, 300 frames, and so on, can be designated.

After the machine learning analysis is completed, the start and end point of the minimum desired loop can be identified. The section of the first video comprising the minimum desired video loop can be extracted by the extracting component and used as the basis of a new synthesized video segment to be added to the end of the first video. As stated above and throughout, the loop can be identified by the machine learning model so that the ending of the first video and the beginning of the synthesized video loop are barely perceptible to human viewers.

The block diagram 200 includes generating a first audio file 246. In embodiments, creating the first audio file can include writing a script, wherein the script includes text. The creating the first audio file can further include recording 248 a user reading the text. The text script can be used to highlight a product for sale, respond to a viewer comment or question, honor a viewer for a donation or significant purchase, make an announcement, and so on. The user recording the script can be a voice actor, product specialist, sales associate, website operator, help desk operator, etc. In some embodiments, the user recording the script can be an AI machine learning model. The result of the recording can be the first audio file with a recorded script that can be used to replace the audio spoken by the host of the first video loop extracted from the first video. The first audio file 246 can also be created by an obtaining component 242 and a synthesizing component 244. The obtaining component can obtain audio information from the performance of the individual in the video. This audio information can then be fed into the synthesizing component 244 which can be used to synthesize the voice of the individual, wherein the synthesizing is based on a script. In embodiments, the synthesizing component includes a machine learning model such as a neural network that can read the script and generate the voice of the individual reading the words for the script.

The block diagram 200 includes a manipulating component 240. The manipulating component 240 is used to manipulate lips of the individual within the video information which was extracted, wherein the manipulating is based on the first audio file 246. In embodiments, the first video can contain face and mouth movements by the individual. Using a machine learning artificial intelligence (AI) neural network, the images of the host can be used to create a model of the host, focusing on mouth movements, facial expressions, and gestures. The facial movements of mouth, eyes, and nose can be analyzed along with the accompanying vocal sounds to isolate words, phrases, phonemes (single vocal sounds that make up words), diphthongs (combinations of vowel sounds), and so on. Each mouth and face movement can be linked to the associated word sounds and text so that stored elements of a video database of isolated mouth and face movements can be combined to coincide with the appropriate vocal sounds contained in an audio file. The various components of the video model can be isolated and swapped out, so that the words and phrases of an audio file can be used to manipulate the lips and facial movements of a video host appearing in a video loop. In embodiments, the video information used by the manipulating component can further comprise synthesizing one or more new gestures for the video host, wherein the gestures are based on the first audio file. The one or more gestures can include one or more repetitive head movements. A model of the video host can be built using a generative model. The generative model can include a generative adversarial network (GAN). A generative adversarial network (GAN) includes two parts. A generator learns to generate plausible data using digital images of the host as input. The generated instances are input to a discriminator. The discriminator learns to distinguish the generator's fake data from real data by comparing the generated facial features to the facial features of the host. The discriminator penalizes the generator for generating implausible results. During the training process, over time, the output of the generator improves, and the discriminator has less success distinguishing real output from fake output. Once the fake output of the video host is sufficiently plausible, it can be used in the creation of synthesized video loop segments.

The block diagram 200 includes a creating component 250. The creating component 250 can be used to create a second video 270. The second video can include a video loop, video information from the manipulating component, and a first audio file. A manipulating component can combine the video loop that was extracted and the audio file and can edit the video loop so that the lips and facial features of the individual in the video coincide with the words and phrases of the audio file. Thus, the combination of the extracted video loop, the manipulated video information, and the audio file can be used to create a second video, featuring the individual speaking the contents of the recorded audio file with lip and facial features appropriate to the words being spoken. In embodiments, the combined second video loop can be stitched to the end of the first video loop so that the transition from the end of the first video loop to the second video loop cannot be detected by the viewer. In some embodiments, the second video can comprise a stream. The first and second video can comprise a livestream. The first and second video can also comprise a video help line for a customer, a lecture delivered by a teacher followed by a question-and-answer session, responses to an online product demonstration, news items delivered by an anchorperson at a news desk, and so on.

The block diagram 200 includes an enabling component 260. The enabling component 260 can be used to enable, within an ecommerce environment, an ecommerce purchase of one or more products for sale 262. The second video 270 can include the one or more products for sale 262 and the ecommerce environment. In embodiments, the video host can highlight products and services for sale in the first video, the second video, or both. In some embodiments, the first and second video can comprise a livestream event. The host can demonstrate, endorse, recommend, and otherwise interact with one or more products for sale. An ecommerce purchase of at least one product for sale can be enabled to the viewer, wherein the ecommerce purchase is accomplished within the livestream video window. As the host interacts with and presents the products for sale, a product card can be included within a livestream shopping window. An ecommerce environment associated with the livestream event can be generated on the viewer's mobile device or other connected television device as the event progresses. The ecommerce environment on the viewer's mobile device can display the livestream event and the ecommerce environment at the same time. A mobile device user can interact with the product card in order to learn more about the product with which the product card is associated. While the user is interacting with the product card, the livestream video event continues to play. Purchase details of the at least one product for sale are revealed, wherein the revealing is rendered to the viewer. The viewer can purchase the product through the ecommerce environment, including a virtual purchase cart. The viewer can purchase the product without having to "leave" the livestream event or video. Leaving the livestream event can include having to disconnect from the event, open an ecommerce window separate from the livestream event, and so on. The livestream event can continue while the viewer is engaged with the ecommerce purchase. In embodiments, the livestream event can continue "behind" the ecommerce purchase window, where the virtual purchase window can obscure or partially obscure the livestream event. In some embodiments, the synthesized video segment can display the virtual product cart while the synthesized video segment plays. The virtual product cart can cover a portion of the synthesized video segment while it plays.

As described above and throughout, the video loop identified and extracted from the first video can be used multiple times to create additional video loops by combining the loop video with additional recorded or synthesized audio files and manipulated lip and facial video segments. Further text scripts can be written, spoken, and recorded by a user, and the user's voice can be replaced by the synthesized voice of the video host. The resulting audio file can be used to manipulate lip and facial video movements, and the combined audio and facial features video can be inserted into the video loop to create third, fourth, fifth, and so on video loops to be appended to the second video viewed by users. In some embodiments, a subsequent video loop can be used to replace an earlier segment so that when the entire set of video loops is replayed, a different response to a question or additional information is given in response to a viewer question, for example. A change in the price of an item for sale can be updated by replacing a video loop, answers to additional questions from viewers can be appended to the last loop, news items can be added and presented by a news anchor, new items can be presented and sold by a livestream host, weather updates can be presented, and so on.

Figure 3:
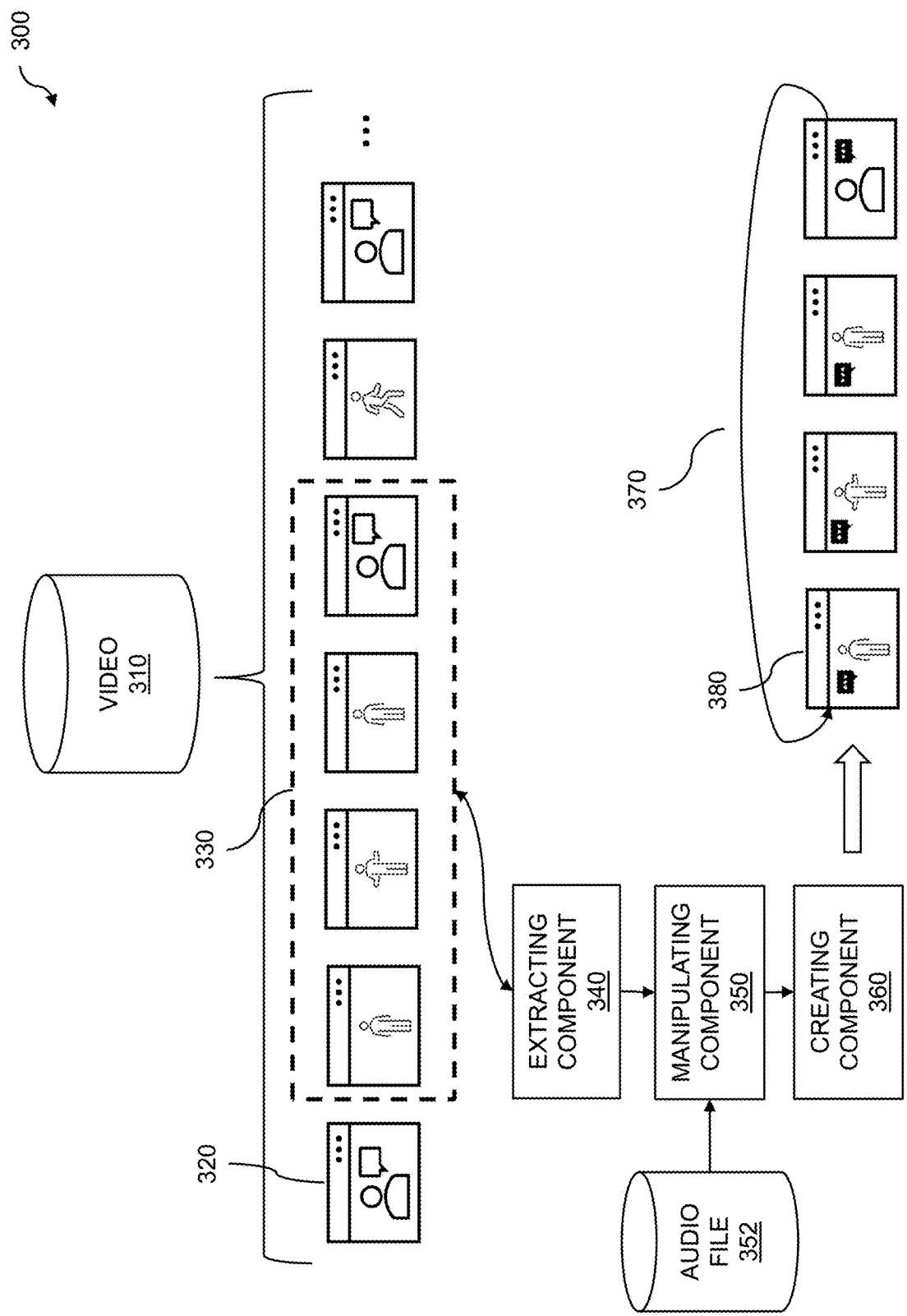
FIG. 3 is an infographic for an expandable video loop with replacement audio.

FIG. 3 is an infographic for an expandable video loop with replacement audio. The infographic 300 includes accessing a first video 310, wherein the first video includes a performance by an individual 320. In embodiments, the first video can include an organic, sponsored, or promotional short-form video. In some embodiments, the first video can comprise a livestream video or livestream video replay. Livestream events are broadcast over the Internet for live viewing. These events are typically recorded for rebroadcast as stand-alone videos in complete or edited form. The individual hosting the video can be a livestream host, a product expert, a social media influencer, a teacher, a sales associate, and so on. In some embodiments, one or more products for sale can be presented by the individual.

The infographic 300 includes identifying a minimum desired video loop 330 within the performance of the individual. A video loop is a video or video segment that repeats itself, in some cases multiple times. Video loops can be used to draw viewer attention, emphasize content, add length, and so on. The minimum desired loop can be a segment of the first video that, when repeated, does not appear obvious to a viewer that the video is looping. The minimum desired loop can be identified by machine learning. In embodiments, the minimum desired loop can be used to extend the length of the first video in order to provide additional audio and video content without recording additional video footage. The loop can be long enough to allow synthesized audio and video to be generated and combined with the loop footage. It can also be long enough to allow the loop to be added to the end of the first video without the viewer noticing that the video is being repeated. In embodiments, the determining of a minimum desired loop can be accomplished by analyzing the first video. The analyzing can be done by artificial intelligence (AI) machine learning and can include detecting one or more words spoken by the host or one or more actions of the host; assessing the body position of the host; determining one or more voice inflections of the host; and/or detecting one or more subject matters discussed by the host. The object of the analysis is to identify beginning and ending points in the first video where the synthesized video loop can be added into the real-time replay seamlessly, so that the viewers are unaware of the transition from the first video to the video loop. In some embodiments, a minimum length for the video loop, e.g., ten seconds, 300 frames, and so on, can be set by a user. In some embodiments, the determining of the insertion point can be based on the interaction of viewers to a livestream video event. As the video is played, viewers can ask for more information about a product for sale that is highlighted by the host, interact on a particular subject being discussed by the host, etc. If a viewer completes a purchase, donates, or signs up for a promotion, the operator can insert a response by the host using a synthesized video loop segment. AI-generated speech can be used to add the username of the viewer as provided in a text interaction during the livestream event, etc.

The infographic 300 includes an extracting component 340. The extracting component 340 can be used to copy the minimum desired video loop 330. The extracted video loop can be used to create additional video loops 370 that can be altered and appended to the end of the first video loop. In embodiments, the minimum desired loop, when viewed repeatedly by a human, may not be easily perceivable as a loop. The runtime of a single loop of the minimum desired loop can comprise one or more gestures or head movements by the individual. After the machine learning analysis is completed, the start and end point of the minimum desired loop can be identified. The section of the first video comprising the minimum desired video loop can be extracted, copied, and used as the basis of a new synthesized video segment to be added to the end of the first video.

The infographic 300 includes a manipulating component 350. The manipulating component 350 can be used to manipulate the lips and facial features of the individual in the video loop. In embodiments, the first video 310 can contain face and mouth movements made by the individual. Using a machine learning artificial intelligence (AI) neural network, the images of the host can be used to create a model of the host, focusing on mouth movements, facial expressions, and gestures. The facial movements of mouth, eyes, and nose can be analyzed along with the accompanying vocal sounds to isolate words, phrases, phonemes (single vocal sounds that make up words), diphthongs (combinations of vowel sounds), and so on. Each mouth and face movement can be linked to the associated word sounds and text so that stored elements of a video database of isolated mouth and face movements can be combined to coincide with the appropriate vocal sounds contained in an audio file. The various components of the video model can be isolated and swapped out, so that the words and phrases of an audio file 352 can be used to manipulate the lips and facial movements of a video host appearing in a video loop. In embodiments, the video information used by the manipulating component can further comprise synthesizing one or more new gestures for the individual, wherein the gestures are based on an audio file. The one or more gestures can include one or more repetitive head movements. A model of the video host can be built using a generative model. The generative model can include a generative adversarial network (GAN). A generative adversarial network (GAN) includes two parts. A generator learns to generate plausible data using digital images of the host as input. The generated instances are input to a discriminator. The discriminator learns to distinguish the generator's fake data from real data by comparing the generated facial features to the facial features of the host. The discriminator penalizes the generator for generating implausible results. During the training process, over time, the output of the generator improves, and the discriminator has less success distinguishing real output from fake output. Once the fake output of the video host is sufficiently plausible, it can be used in the creation of synthesized video loop segments.

The infographic 300 includes an audio file 352. In embodiments, the audio file can be obtained by creating a written script and generating a recording of the script read by a user. The text script can be used to highlight a product for sale, respond to a viewer comment or question, honor a viewer for a donation or significant purchase, make an announcement, and so on. The user can be a voice actor, teacher, product expert, announcer, livestream host, help desk staff person, and so on. In embodiments, the audio file can be created by synthesizing the voice of the individual by a machine learning model such as a neural network. In other embodiments, the user recording the script can be an AI machine learning model. The result of the recording can be an audio file 352 with a recorded script that can replace the audio spoken by the host of the video loop extracted from the first video.

In embodiments, an imitation-based algorithm can take the recorded voice of the user reading a script in an audio file as input to a voice conversion module. A neural network, such as a Generative Adversarial Network (GAN) can be used to record the style, intonation, and vocal qualities of both the individual and the first audio file user, convert them into linguistic data, and use the characteristics of the host voice to repeat the text of the user in a first audio file. The phrase can be recorded and analyzed. The text of the phrase can be processed along with the vocal characteristics of speed, inflection, emphasis, and so on. The text and vocal characteristics can then be replayed using the style, intonation, and vocal inflections of the individual without changing the text, speed, or emphases of the first audio user's statement. Thus, the words and phrases spoken by the audio file user are heard in the voice of the individual. The GAN processing can be used to incrementally improve the quality of the individual's voice by comparing it to recordings of the host. As more data on the individual's voice is collected and used to generate speech, the ability to mimic the voice improves. The result of the synthesizing component can be an updated first audio file 352 containing the recorded text of the audio file in the voice of the individual.

The infographic 300 includes a creating component 360. The creating component 360 can be used to create one or more new video loops that can combine the first video loop that was extracted with the audio file 352. The video of the individual 380 in one or more new video loops can have modified facial features, including the lips, that coincide with different text from the audio file 352. In embodiments, one or more new video loops can be stitched together so that the transition from one loop to another cannot be detected by the viewer. In some embodiments, the combined first video and video loops can comprise a stream or a livestream. The combined first video and the video loops can also comprise a video help line for a customer, a lecture delivered by a teacher followed by a question-and-answer session, responses to an online product demonstration, news items delivered by an anchorperson at a news desk, and so on.

Figure 4:
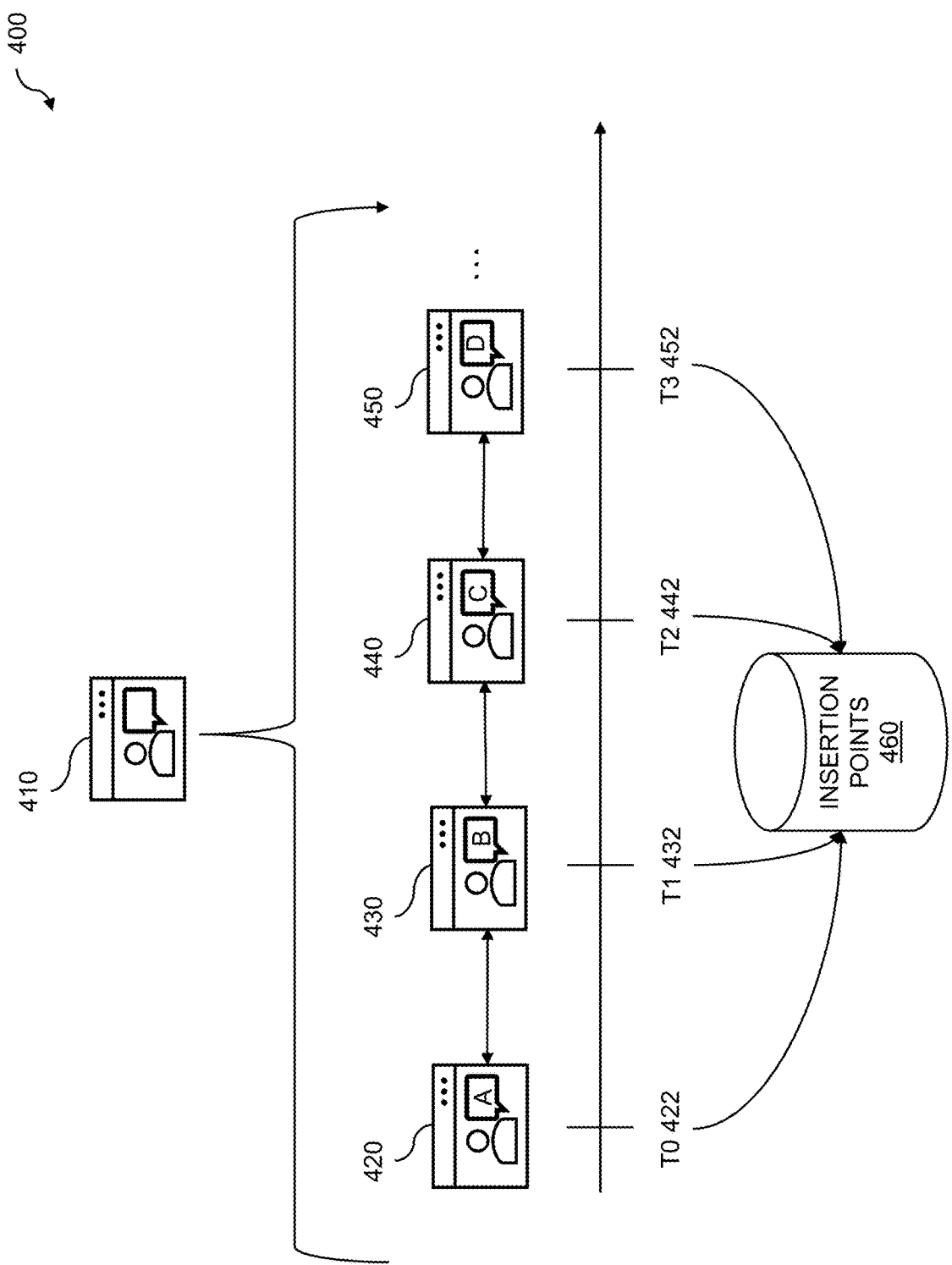
FIG. 4 is an example of finding insertion points.

FIG. 4 is an example of finding insertion points. A first video can be accessed and analyzed. Additional video segments related to products and subjects discussed during the first video can be accessed or created by the operator. The additional video segments can be created based on comments or questions raised by viewers during a video playback or livestream event in addition to segments preselected based on subjects and products discussed in the first video. An operator can use an AI machine learning model to create a performance of an individual in the video segments with the gestures, mouth, and voice of the video host. The first video can be analyzed to determine insertion points for the synthesized video segments. The video operator can select the insertion point based on the comments and questions raised by viewers during the video event, so that the synthesized video segment becomes the response to the viewer comment or question. The insertion of the synthesized video segment can be accomplished dynamically and can appear seamless to the viewer. The insertion of the synthesized video segment can be accomplished by stitching the segment into the video event at one of the determined insertion points. One or more boundary frames can be identified in the video and the synthesized video segment and used to smooth the transition from the video to the video segment. At the end of the synthesized video segment, boundary frames can be used to smooth the transition back to the remainder of the video.

The example 400 includes a video 410. The video can include audio, video, or both at the same time. Videos can include a wide variety of topics including sporting events, video games, artistic performances, marketing campaigns, political speeches, advertising presentations, and so on. Once recorded, the video event can be replayed and expanded as viewers comment on and interact with the replay of the video event in real time. In some embodiments, the video can be produced from a synthesized short-form video that can include a synthesized version of a host.

The example 400 includes a video operator analyzing a video 410 to determine one or more insertion points 460 for one or more synthesized video segments. In embodiments, the analyzing can include detecting one or more words spoken by a host, one or more actions of the host, one or more voice inflections of the host, or one or more subject matters discussed by the host; assessing the body position of the host; and so on. As in other forms of media editing, the determining of insertion points can be based on replicating what a viewer sitting in a theater, attending a movie, or watching television does naturally by focusing on the most important actors and actions in view. The closer the insertion point matches the exact moment when a viewer expects to see or hear an answer to a question or a response to a comment, to see a product in use, or to view a closeup of the host's face, etc., the more invisible the transition from the video to the inserted video segment will be. Another element of determining the insertion point is making sure that the tone values and scene arrangement of the last frame of the video match, as nearly as possible, the tone values and scene arrangement of the first frame of the inserted video segment. For example, the transition to a synthesized video segment can include a view of a product for sale in the first few frames of the video segment, followed by a view of the host performing the remainder of the video segment in the same setting as that of the video. Today's media viewers are accustomed to a still view of a product lasting two to three seconds as a host voice speaks about the product in commercial advertising, video events, and in-home shopping network segments. Selecting a point in a video where the host begins to speak about a product for sale can provide a likely spot for inserting a synthesized video segment with more information about the product. After the still view of the product is complete, the synthesized video segment can continue with a view of the host in the same setting as before the insertion of the video segment. The viewer continues to watch the synthesized video segment without noticing the transition from the video to the video segment.

The analyzing of the video 410 to determine insertion points 460 can be accomplished by an artificial intelligence (AI) machine learning neural network. In some embodiments, the insertion points can be located in the video using a generative model. The generative model can include a generative adversarial network (GAN). A generative adversarial network (GAN) includes two parts. A generator learns to generate plausible insertion points in a video. The generated instances are input to a discriminator. The discriminator learns to distinguish the generator's fake data from real data. The real data can come from a set of video segment insertions completed by a professional editor. The data can include the actions and body positions of the host in the video frames just prior to the insertion point; the text, subject matter, and vocal inflections of the host's voice just prior to the insertion point; and so on. The discriminator penalizes the generator for generating implausible results. During the training process, over time, the output of the generator improves, and the discriminator has less success distinguishing real output from fake output. The generator and discriminator can be implemented as neural networks, with the output of the generator connected to the input of the discriminator. Embodiments may utilize backpropagation to create a signal that the generator neural network uses to update its weights.

The discriminator may use training data coming from two sources: real data, which can include insertion points in the video selected by one or more professional editors, and fake data, which are insertion points identified by the generator. The discriminator uses the fake data as negative examples during the training process. A discriminator loss function is used to update weights via backpropagation for discriminator loss when it misidentifies an insertion point. The generator learns to create fake data by incorporating feedback from the discriminator. Essentially, the generator learns how to "trick" the discriminator into classifying its output as real. A generator loss function is used to penalize the generator for failing to trick the discriminator. Thus, in embodiments, the generative adversarial network (GAN) includes two separately trained networks. The discriminator neural network can be trained first, followed by training the generative neural network, until a desired level of convergence is achieved. In embodiments, first video and synthesized video segment analyses may be used to generate a set of acceptable insertion points. In FIG. 4, four insertion points are identified: T0 422, T1 432, T2 442, and T3 452. The insertion points correspond to four frames in the video (420, 430, 440, and 450) that are identified by the video operator and AI machine learning model. In embodiments, the at least one insertion point can be stored with metadata associated with the first video.

Figure 5:
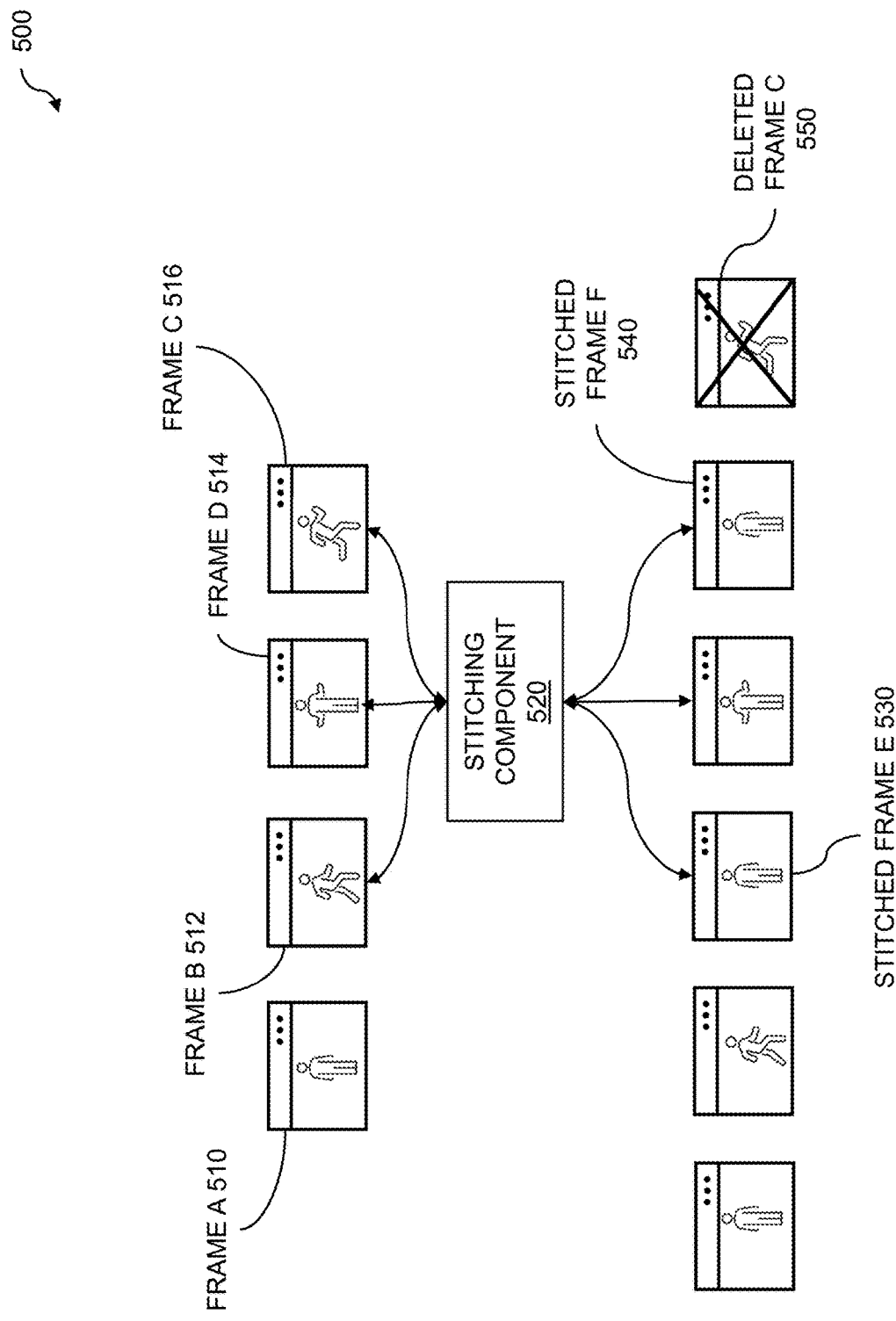
FIG. 5 an infographic for stitching.

FIG. 5 is an infographic for stitching. A first video can be analyzed to determine insertion points for placing synthesized video segments into the video. The insertion points can be determined based on words spoken by the host, actions taken by the host, voice inflections of the host, subjects discussed by the host, body positions of the host, and so on. The video operator can select the insertion point based on the comments and questions raised by viewers during a livestream video event, so that the synthesized video segment becomes the response to a viewer comment or question. The insertion of the synthesized video segment can be accomplished by stitching the segment into the first video at one of the determined insertion points. One or more boundary frames can be identified in the first video and the synthesized video segment, and can be used to smooth the transition from the first video to the video segment. The stitching component can insert or remove one or more frames from the beginning or end of the video segment or from the boundary frames of the first video in order to make the transition from one to the other seamless. At the end of the synthesized video segment, boundary frames can be used to smooth the transition back to the remainder of the first video.

The infographic 500 includes a stitching component 520. In embodiments, the stitching component analyzes a first video using an AI machine learning model. In the infographic 500, the stitching component 520 determines an insertion point between Frame B 512 and Frame D 514 of the first video in which to place a synthesized video segment Frame E 530. In some embodiments, the stitching component can use an AI machine learning model in a similar manner to the stitching component, using a generative model. The machine learning model can include the actions and body position of the host in the video frames just prior to the insertion point between Frame B 512 and Frame D 514; the text, subject matter, and vocal inflections of the host's voice just prior to the insertion point; and so on. The stitching process may use copies of frames from other points in the video or synthesized video. It can repeat frames within either video or delete frames as needed in order to produce the least noticeable transition from the video to the synthesized video. The resulting video in our example can thus be Frame A 510, Frame B 512, stitched Frame E 530, synthetic video segment Frame D 514, stitched frame F 540.

The stitching can also include deleting one or more frames of the first video. In FIG. 5, Frame C 516 is shown as Deleted Frame C 550 after the stitching process is complete. Deleting one or more frames of the video may be required to make the least noticeable transition from the first video to the synthesized video, or from the end of the synthesized video segment to the remainder of the first video. For example, the last statement of the host in the synthesized video segment may be the same as or similar to the first statement of the remaining first video to be rendered after the synthesized video segment. The video operator can determine that the best stitching option is to delete the first statement of the host Frame C 550 in the remaining first video after the insertion point, so that the statement rendered to the viewers is made by the host at the end of the synthesized video segment Frame D 514. In some embodiments, the inserted synthesized video segment becomes the response to an interaction by one or more viewers of the first video. The inserting process can include more than one synthesized video segment as more comments or questions from viewers occur during a video event.

Figure 6:
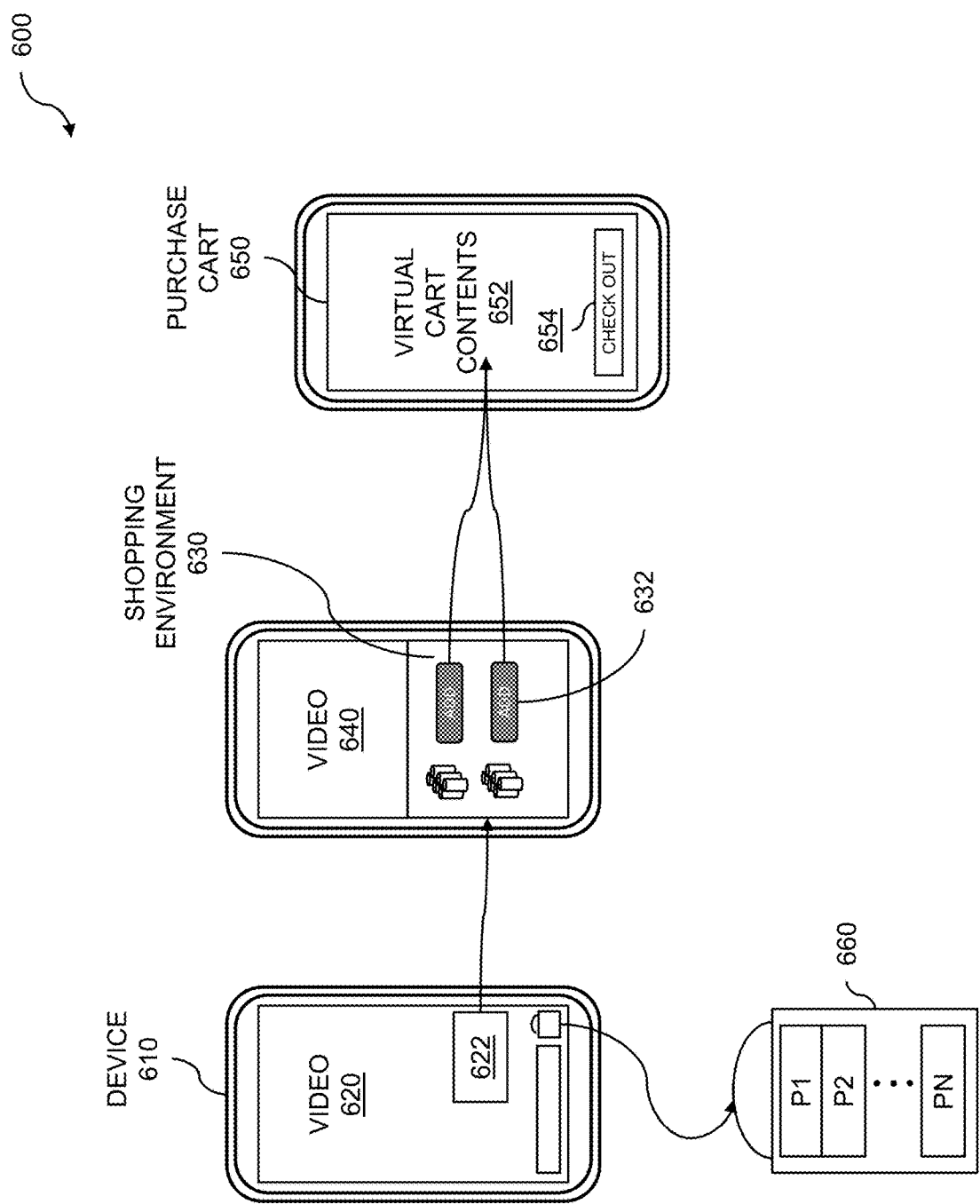
FIG. 6 is an ecommerce environment.

FIG. 6 is an ecommerce environment. As described above and throughout, a first video can be accessed and rendered to one or more viewers. The video can be a livestream event. The rendering can include synthesized video segments that can be inserted in response to comments from viewers. The video can highlight one or more products available for purchase. An ecommerce purchase can be enabled during the rendering of the video using an in-frame shopping environment. The in-frame shopping environment can allow connected viewers or participants of the livestream event to buy products and services during the video playback or livestream event. The livestream event can include an on-screen product card that can be viewed on a mobile device. The in-frame shopping environment or window can also include a virtual purchase cart that can be used by viewers as the short-form video or livestream event plays.

The environment 600 includes a device 610 displaying a short-form video 620 as part of a livestream event. In embodiments, the first video can be viewed in real time or replayed at a later time. The device 610 can be a smart TV which can be directly attached to the Internet; a television connected to the Internet via a cable box, TV stick, or game console; an Over-the-Top (OTT) device such as a mobile phone, laptop computer, tablet, pad, or desktop computer; etc. In embodiments, the accessing the first video on the device can be accomplished using a browser or another application running on the device.

The environment 600 includes generating and revealing a product card 622 on the device 610. In embodiments, the product card represents at least one product available for purchase while the livestream or short-form video plays. Embodiments can include inserting a representation of the first object into the on-screen product card. A product card is a graphical element such as an icon, thumbnail picture, thumbnail video, symbol, or other suitable element that is displayed in front of the video. The product card is selectable via a user interface action such as a press, swipe, gesture, mouse click, verbal utterance, or other suitable user action. The product card can be inserted when the first video 620 or an inserted synthesized video segment 640 are visible in the livestream event. When the product card is invoked, an in-frame shopping environment 630 is rendered over a portion of the video while the video continues to play. This rendering enables an ecommerce purchase 632 by a user while preserving a continuous video playback session. In other words, the user is not redirected to another site or portal that causes the video playback to stop. Thus, viewers are able to initiate and complete a purchase entirely inside of the video playback user interface, without being directed away from the currently playing video. Allowing the video or livestream event to play during the purchase can enable improved audience engagement, which can lead to additional sales and revenue, one of the key benefits of disclosed embodiments. In some embodiments, the additional on-screen display that is rendered upon selection or invocation of a product card conforms to an Interactive Advertising Bureau (IAB) format. A variety of sizes are included in IAB formats, such as for a smartphone banner, mobile phone interstitial, and the like.

The environment 600 includes rendering an in-frame shopping environment 630 to enable a purchase of the at least one product for sale by the viewer, wherein the ecommerce purchase is accomplished within the video or livestream event window. In embodiments, the video or livestream event can include the first video or an inserted synthetic video segment. The enabling can include revealing a virtual purchase cart 650 that supports checkout 654 of virtual cart contents 652, including specifying various payment methods, and applying coupons and/or promotional codes. In some embodiments, the payment methods can include fiat currencies such as United States dollar (USD), as well as virtual currencies, including cryptocurrencies such as Bitcoin. In some embodiments, more than one object (product) can be highlighted and enabled for ecommerce purchase. In embodiments, when multiple items 660 are purchased via product cards during the livestream event, the purchases are cached until termination of the video, at which point the orders are processed as a batch. The termination of the video can include the user stopping playback, the user exiting the video window, the livestream ending, or a prerecorded video ending. The batch order process can enable a more efficient use of computer resources, such as network bandwidth, by processing the orders together as a batch instead of processing each order individually.

Figure 7:
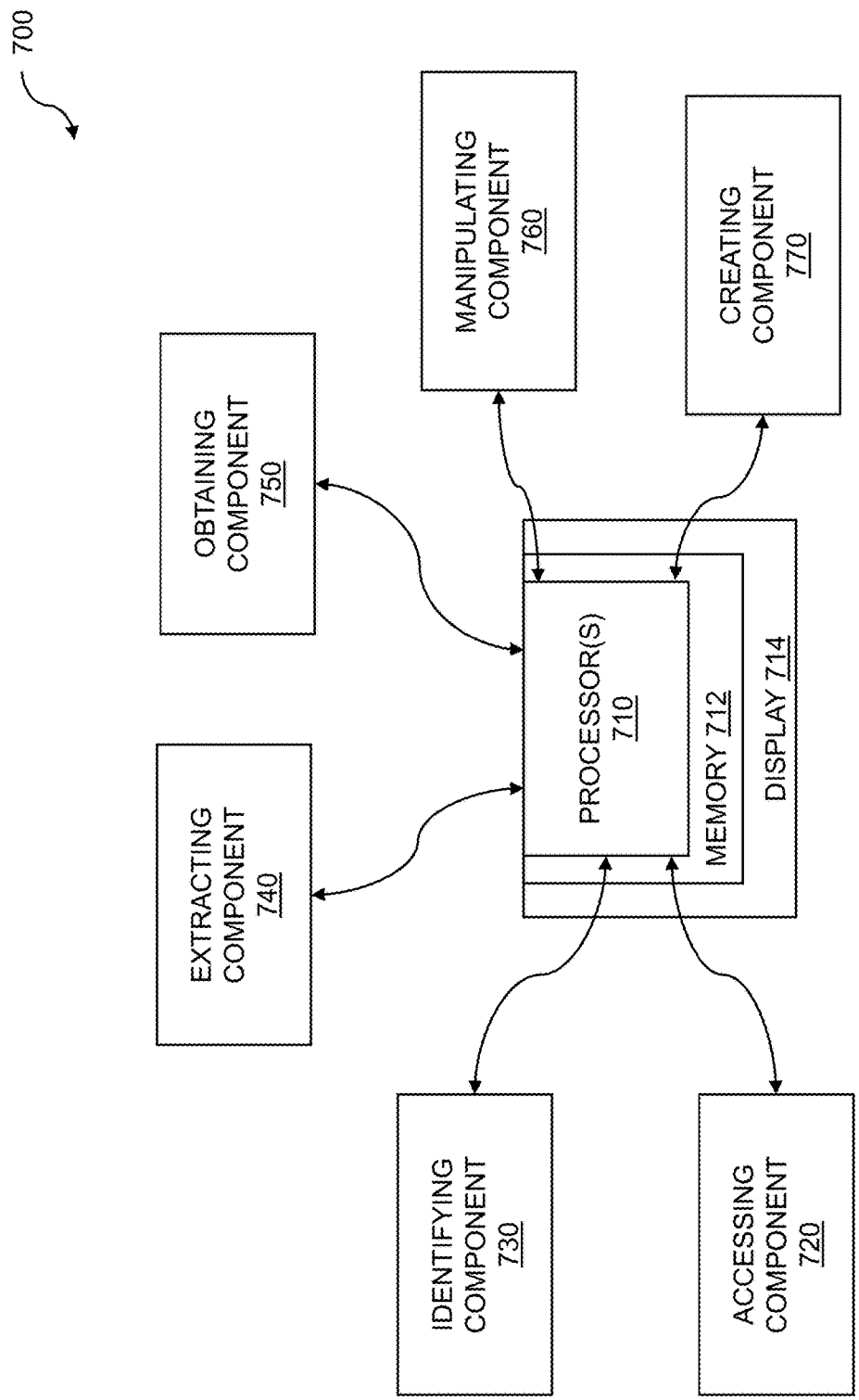
FIG. 7 is a system diagram for an expandable video loop with replacement audio.

FIG. 7 is a system diagram for an expandable video loop with replacement audio. The system 700 can include one or more processors 710 coupled to a memory 712 which stores instructions. The system 700 can include a display 714 coupled to the one or more processors 710 for displaying data, video streams, videos, intermediate steps, instructions, and so on. In embodiments, one or more processors 710 are coupled to the memory 712 where the one or more processors, when executing the instructions which are stored, are configured to: access a first video, wherein the first video includes a performance by an individual; identify, using one or more processors, a minimum desired loop within the performance by the individual; extract video information from the minimum desired loop that was identified within the first video; obtain a first audio file; manipulate lips of the individual within the video information which was extracted, wherein the manipulating is based on the first audio file; and create a second video, wherein the second video comprises a second loop, wherein the second loop includes the video information which was manipulated, and wherein the second video includes the first audio file.

The system 700 includes an accessing component 720. The accessing component 720 can include functions and instructions for accessing a first video, wherein the first video includes a performance by an individual. In embodiments, the first video can be an organic, sponsored, or promotional short-form video, etc. Organic videos are made by users and are shared using free, built-in capabilities of a particular social media platform. Sponsored videos are paid for and directly associated with a particular organization, group, or individual. Promotional videos are presented to viewers by third parties, celebrities, social media influencers, advertisers, product manufacturers, etc. In some embodiments, the first video can comprise a livestream video or livestream video replay. Livestream events are broadcast over the Internet for live viewing. These events can be recorded for rebroadcast as stand-alone videos in complete or edited form.

The system 700 includes an identifying component 730. The identifying component 730 can include functions and instructions for identifying, using one or more processors, a minimum desired loop within the performance by the individual. A video loop is a video or video segment that repeats itself, in some cases multiple times. A runtime of a single loop of the minimum desired loop can comprise ten or more seconds. In embodiments, the minimum desired loop can include one or more gestures or head movements by the individual. The minimum desired loop can be used to extend the length of the first video in order to provide additional audio and video content without recording additional video footage. The loop can be long enough to allow synthesized audio and video to be generated and combined with the loop footage. It can also be long enough to allow the loop to be added to the end of the first video without the viewer noticing that the video is being repeated. In embodiments, the minimum desired loop, when viewed repeatedly by a human, is not easily perceivable as a loop.

In embodiments, the determining of a minimum desired loop can be accomplished by analyzing the first video. The analyzing can be done by artificial intelligence (AI) machine learning and can include detecting one or more words spoken by the host or one or more actions of the host; assessing the body position of the host; determining one or more voice inflections of the host; and/or detecting one or more subject matters discussed by the host. The object of the analysis is to identify beginning and ending points in the first video where the synthesized video loop can be added into the real-time replay seamlessly, so that the viewers are unaware of the transition from the first video to the video loop. In some embodiments, a minimum length for the video loop, e.g., ten seconds, 300 frames, and so on, can be set by a user. In some embodiments, the determining of the insertion point can be based on the interaction of viewers to a livestream video event. As the video is played, viewers can ask for more information about a product for sale that is highlighted by the host, interact on a particular subject being discussed by the host, etc. If a viewer completes a purchase, donates, or signs up for a promotion, the operator can insert a response by the host using a synthesized video loop segment. AI-generated speech can be used to add the username of the viewer as provided in a text interaction during the livestream event, etc.

The system 700 includes an extracting component 740. The extracting component 740 can include functions and instructions for extracting video information from the minimum desired loop that was identified within the first video. In embodiments, the machine learning analysis can be used to identify the start and end point of the minimum desired loop. The section of the first video comprising the minimum desired video loop can be extracted, copied, and used as the basis of a new synthesized video segment to be added to the end of the first video. As stated above and throughout, the loop is identified by the machine learning model so that the ending of the first video and the beginning of the synthesized video loop are not easily noticed by human viewers.

The system 700 includes an obtaining component 750. The obtaining component 750 can include functions and instructions for obtaining a first audio file. In embodiments, obtaining the first audio file can include writing a script, wherein the script comprises text. The script can be used to highlight a product for sale, respond to a viewer comment or question, honor a viewer for a donation or significant purchase, make an announcement, and so on. A user can be recorded reading the script. The user recording the script can be a voice actor, impressionist, mimic, and so on. In some embodiments, the user recording the script can be an AI machine learning model.

In embodiments, audio information from the performance by the individual video host in the first video can be extracted. The voice of the individual can be synthesized, wherein the synthesizing is based on the script. In some embodiments, the synthesizing can include one or more new gestures for the individual, wherein the gestures are based on the first audio file. The gestures can include one or more repetitive head movements. In embodiments, an imitation-based algorithm takes the recorded voice of the user reading a script in a first audio file as input to a voice conversion module. A neural network, such as a Generative Adversarial Network (GAN), can be used to record the style, intonation, and vocal qualities of both the individual and the first audio file user, convert them into linguistic data, and use the characteristics of the host voice to repeat the text of the user in a first audio file. For example, the user performing in the first audio file can say the phrase, "My name is Joe." The phrase can be recorded and analyzed. The text of the phrase can be processed along with the vocal characteristics of speed, inflection, emphasis, and so on. The text and vocal characteristics can then be replayed using the style, intonation, and vocal inflections of the individual without changing the text, speed, or emphases of the first audio user's statement. Thus, the same phrase, "My name is Joe", is heard in the voice of the individual. The GAN processing can be used to incrementally improve the quality of the individual's voice by comparing it to recordings of the host. As more data on the individual's voice is collected and used to generate speech, the ability to mimic the voice improves.

In embodiments, the first audio file can be used to identify a minimum desired video loop. The length of the first audio file can be used to determine the shortest length possible for the minimum desired video loop. In embodiments, as additional video loops are generated to add to the first video, video frames can be added, repeated, or deleted from the end of the first video or the beginning of the video loop in order to make the transition from the first video to the video loop unnoticeable by the viewer. In some embodiments, the length of the video loop can be extended by adding frames or shortened by deleting frames in order to fit the length of an additional recorded audio file.

The system 700 includes a manipulating component 760. The manipulating component 760 can include functions and instructions for manipulating lips of the individual within the video information which was extracted, wherein the manipulating is based on the first audio file. In embodiments, the first video can contain face and mouth movements by the individual. Using a machine learning artificial intelligence (AI) neural network, the images of the host can be used to create a model of the host, focusing on mouth movements, facial expressions, and gestures. The facial movements of mouth, eyes, and nose can be analyzed along with the accompanying vocal sounds to isolate words, phrases, phonemes (single vocal sounds that make up words), diphthongs (combinations of vowel sounds), and so on. Each mouth and face movement can be linked to the associated word sounds and text so that stored elements of a video database of isolated mouth and face movements can be combined to coincide with the appropriate vocal sounds contained in an audio file. The various components of the video model can be isolated and swapped out as desired, so that the words and phrases of a synthesized audio file can be used to manipulate the lips and facial movements of a video host appearing in a video loop. In embodiments, the video information that was manipulated can further comprise synthesizing one or more new gestures for the individual, wherein the gestures are based on the first audio file. The one or more gestures include one or more repetitive head movements. A model of the video host can be built using a generative model. The generative model can include a generative adversarial network (GAN). A generative adversarial network (GAN) includes two parts. A generator learns to generate plausible data using digital images of the host as input. The generated instances are input to a discriminator. The discriminator learns to distinguish the generator's fake data from real data by comparing the generated facial features to the facial features of the host. The discriminator penalizes the generator for generating implausible results. During the training process, over time, the output of the generator improves, and the discriminator has less success distinguishing real output from fake output. Once the fake output of the video host is sufficiently plausible, it can be used in the creation of synthesized video loop segments.

The system 700 includes a creating component 770. The creating component 770 can include functions and instructions for creating a second video, wherein the second video comprises a second loop, wherein the second loop includes the video information which was manipulated, and wherein the second video includes the first audio file. In embodiments, the extracted video loop can be combined with the audio file so that the lips and facial features of the video host coincide with the words and phrases of the audio file. Thus, the combination of the video loop extracted and copied from the first video, the manipulated lip and facial video information, and the synthesized audio file can be used to create a second video, featuring the video host speaking the contents of the audio file with lip and facial features appropriate to the words being spoken. In embodiments, the combined second video loop can be stitched to the end of the first video loop so that the transition from the end of the first video loop to the second video loop cannot be detected by the viewer. In some embodiments, the second video can comprise a stream. The first and second video can comprise a livestream. The first and second video can also comprise a video help line for a customer, a lecture delivered by a teacher followed by a question-and-answer session, responses to an online product demonstration, news items delivered by an anchorperson at a news desk, and so on.

In some embodiments, the creating component 770 can enable, within an ecommerce environment, an ecommerce purchase of one or more products for sale, wherein the second video includes the one or more products for sale, and wherein the second video includes the ecommerce environment. In embodiments, the video host can highlight products and services for sale. The first and second video can comprise a livestream event. The host can demonstrate, endorse, recommend, and otherwise interact with one or more products for sale. An ecommerce purchase of at least one product for sale can be enabled to the viewer, wherein the ecommerce purchase is accomplished within the livestream video window. As the host interacts with and presents the products for sale, a product card can be included within a livestream shopping window. An ecommerce environment associated with the livestream event can be generated on the viewer's mobile device or other connected television device as the event progresses. The ecommerce environment on the viewer's mobile device can display the livestream event and the ecommerce environment at the same time. A mobile device user can interact with the product card in order to learn more about the product with which the product card is associated. While the user is interacting with the product card, the livestream video event continues to play. Purchase details of the at least one product for sale can be revealed, wherein the revealing is rendered to the viewer. The viewer can purchase the product through the ecommerce environment, including a virtual purchase cart. The viewer can purchase the product without having to "leave" the livestream event or video. Leaving the livestream event can include having to disconnect from the event, open an ecommerce window separate from the livestream event, and so on. The livestream event can continue while the viewer is engaged with the ecommerce purchase. In embodiments, the livestream event can continue "behind" the ecommerce purchase window, where the virtual purchase window can obscure or partially obscure the livestream event. In some embodiments, the synthesized video segment can display the virtual product cart while the synthesized video segment plays. The virtual product cart can cover a portion of the synthesized video segment while it plays.

The system 700 can include producing a third loop, wherein the third loop is based on a second audio file. In embodiments, the third loop can include altering lips of the individual within the video information which was extracted, wherein the manipulating is based on the second audio file. In some embodiments, the third loop can be appended to the second loop, or the third loop can be used to replace the second loop. As described above and throughout, the video loop identified and extracted from the first video can be used multiple times to create video loops by combining the video loop with additional synthesized audio files and manipulated lip and facial video segments. More scripts can be written, spoken, and recorded by a user, the user's voice can be replaced by the synthesized voice of the video host, the resulting audio file can be used to generate matching lip and facial video movements, and the combined audio and facial features video can be inserted into the video loop to create third, fourth, fifth, and so on video loops that can be appended to the second video. In some embodiments, a subsequent video loop can be used to replace an earlier segment so that when the entire set of video loops is replayed, a different response to a question or additional information is given in response to a viewer question, for example. A change in the price of an item for sale can be updated by replacing a video loop, answers to additional questions from viewers can be appended to the last loop, news items can be added and presented by a news anchor, new items can be presented and sold by a livestream host, weather updates can be presented, and so on. In some embodiments, the ecommerce environment can be rendered as part of each video loop to allow viewers to purchase products for sale presented by the video host.

The system 700 can include a computer program product embodied in a non-transitory computer readable medium for video generation, the computer program product comprising code which causes one or more processors to perform operations of: accessing a first video, wherein the first video includes a performance by an individual; identifying, using one or more processors, a minimum desired loop within the performance by the individual; extracting video information from the minimum desired loop that was identified within the first video; obtaining a first audio file; manipulating lips of the individual within the video information which was extracted, wherein the manipulating is based on the first audio file; and creating a second video, wherein the second video comprises a second loop, wherein the second loop includes the video information which was manipulated, and wherein the second video includes the first audio file.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams, infographics, and flowchart illustrations depict methods, apparatus, systems, and computer program products. The elements and combinations of elements in the block diagrams, infographics, and flow diagrams show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an crasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for video generation comprising:
　　accessing a first video, wherein the first video includes a performance by an individual;
　　identifying, using one or more processors, a minimum desired loop within the performance by the individual;
　　extracting video information from the minimum desired loop that was identified within the first video;

obtaining a first audio file;

manipulating lips of the individual within the video information which was extracted, wherein the manipulating is based on the first audio file; and creating a second video, wherein the second video comprises a second loop, wherein the second loop includes the video information which was manipulated, and wherein the second video includes the first audio file.

2. The method of claim 1 further comprising producing a third loop.

3. The method of claim 2 wherein the third loop is based on a second audio file.

4. The method of claim 3 wherein the third loop further comprises altering lips of the individual within the video information which was extracted, wherein the manipulating is based on the second audio file.

5. The method of claim 4 further comprising appending the third loop to the second video.

6. The method of claim 4 further comprising replacing, in the second video, the second loop with the third loop.

7. The method of claim 1 wherein the minimum desired loop, when viewed repeatedly by a human, is not easily perceivable as a loop.

8. The method of claim 7 wherein a runtime of a single loop of the minimum desired loop comprises ten or more seconds.

9. The method of claim 7 wherein a runtime of a single loop of the minimum desired loop comprises one or more gestures or head movements by the individual.

10. The method of claim 1 wherein the identifying a minimum desired loop is based on the first audio file.

11. The method of claim 1 wherein the obtaining a first audio file further comprises writing a script, wherein the script comprises text.

12. The method of claim 11 further comprising recording a user reading the script.

13. The method of claim 11 further comprising obtaining audio information from the performance by the individual.

14. The method of claim 13 further comprising synthesizing a voice of the individual, wherein the synthesizing is based on the script.

15. The method of claim 1 further comprising synthesizing one or more new gestures for the individual, wherein the gestures are based on the first audio file.

16. The method of claim 15 wherein the one or more new gestures include one or more repetitive head movements.

17. The method of claim 1 wherein the second video comprises a stream.

18. The method of claim 1 wherein the second video comprises a livestream.

19. The method of claim 1 wherein the second video comprises a video help line for a customer.

20. The method of claim 1 further comprising enabling, within an ecommerce environment, an ecommerce purchase of one or more products for sale, wherein the second video includes the one or more products for sale, and wherein the second video includes the ecommerce environment.

21. A computer program product embodied in a non-transitory computer readable medium for video generation, the computer program product comprising code which causes one or more processors to perform operations of:

accessing a first video, wherein the first video includes a performance by an individual;

identifying, using one or more processors, a minimum desired loop within the performance by the individual;

extracting video information from the minimum desired loop that was identified within the first video;

obtaining a first audio file;

manipulating lips of the individual within the video information which was extracted, wherein the manipulating is based on the first audio file; and creating a second video, wherein the second video comprises a second loop, wherein the second loop includes the video information which was manipulated, and wherein the second video includes the first audio file.

22. A computer system for video generation, comprising:

a memory which stores instructions;

one or more processors coupled to the memory wherein the one or more processors, when executing the instructions which are stored, are configured to:

access a first video, wherein the first video includes a performance by an individual;

identify, using one or more processors, a minimum desired loop within the performance by the individual;

extract video information from the minimum desired loop that was identified within the first video;

obtain a first audio file;

manipulate lips of the individual within the video information which was extracted, wherein the manipulating is based on the first audio file; and create a second video, wherein the second video comprises a second loop, wherein the second loop includes the video information which was manipulated, and wherein the second video includes the first audio file.

* * * * *